United States Patent [19]

Stengle, Jr.

[11] 3,962,939

[45] June 15, 1976

[54] GLASS GOB SHEARING APPARATUS AND METHOD

[75] Inventor: Edward J. Stengle, Jr., Toledo, Ohio

[73] Assignee: Owens-Illinois, Inc., Toledo, Ohio

[22] Filed: May 22, 1975

[21] Appl. No.: 579,984

[52] U.S. Cl. .................................. 83/51; 83/171; 83/623; 83/694
[51] Int. Cl.² ...................... B26D 1/06; B26D 7/08
[58] Field of Search ............ 83/694, 670, 679, 623, 83/600, 171, 51

[56] References Cited
UNITED STATES PATENTS

| | | | |
|---|---|---|---|
| 3,490,326 | 1/1970 | McNamara | 83/694 X |
| 3,817,133 | 6/1974 | Romberg | 83/694 X |

Primary Examiner—Willie G. Abercrombie
Attorney, Agent, or Firm—D. T. Innis; E. J. Holler

[57] ABSTRACT

In a glassmaking process, a pair of reciprocating blades are used to cut a stream of molten glass into discrete charges known as "gobs". The cutting surfaces of the shear blades are maintained in a spaced-apart relationship by pairs of raised portions or rails formed in or on the facing blade surfaces. The raised portions or rails of the blades keep the blades separated a specified distance and thereby extend the wear life of the blades by eliminating friction between the cutting surfaces of the blades. A solid film lubricant is applied to the blades and serves to lubricate both cutting surfaces of the blades, thus the blade surfaces that contact the molten glass stream are lubricated to avoid the possibility of the glass sticking to the shear blades.

14 Claims, 7 Drawing Figures

GLASS GOB SHEARING APPARATUS AND METHOD

BACKGROUND OF THE INVENTION

This invention relates to shears for cutting a molten stream of glass into mold charges known as "gobs" useful particularly in the glass container forming process.

DESCRIPTION OF THE PRIOR ART

Molten glass is discharged from a feeding device in the form of a flowing stream. Gob cutting shears are mounted adjacent the feeding device and are reciprocated to sever the end portion of the glass stream causing it to fall free as a glass gob or mold charge. The prior art shear blades are of a "V" configuration, have a generally curved cutting surface and are in surface-to-surface contact. The shears are moved in a reciprocal motion by a pair of mounting arms which in turn are controlled and moved by a cam and follower mechanism or other mechanisms. The present design of the shear blade apparatus became known about the year 1918 and has continued virtually unchanged to the present day. It has been the practice in the past to lubricate the shear blades by spraying the blades between cutting cycles with an oil-water emulsion. The oil serves to lubricate the blades as they slide over each other and the water keeps the blades cool. In some prior instances, the spraying of shear blades was with an oil-water mixture and the mixture would eventually end up in the drain where a separation would be effected to prevent oil entering the municipal waste systems. When water-oil emulsions were formulated and used, it became necessary to find ways to break the emulsion in order to clean up the effluents in the plant waste system. When water spray, without other additives, was used, it was necessary that stainless steel be used; otherwise the blades would become rusty and iron oxide would flake off the blades.

SUMMARY OF THE INVENTION

This invention relates to a method and apparatus for severing mold charges from a glass stream in which the shear mechanism is designed and operated as a pair of shear blades whose cutting edges are moved through the glass stream do not contact each other, permitting the blades to be coated with a solid film lubricant that will not be mechanically removed from the blades except as a result of actual friction or contact with the glass stream. The blades may be cooled by an actual water spray or be run dry with the blades being cooled by circulation of the coolant through a heat exchanger in contact with the blades.

DETAILED DESCRIPTION OF THE DRAWINGS

Glass containers are manufactured from molten glass which is processed in a glass forming machine. One step in the process is the extrusion of molten glass from a feeder wherein the glass is pushed out through a feeder orifice by the action of a reciprocating plunger. The art of glass feeding includes control of many parameters such as the diameter, temperature, velocity, length and particularly the shape of the stream of extruded molten glass. The flowing molten glass is periodically sheared in time with the plunger reciprocation to produce an elongated mold charge which is termed a "gob". Gob forming is very critical to providing acceptable glass for forming into blown glass containers. Poor gob forming results in containers having uneven bottoms or side walls, crowns which are out of shape, and other defects. This invention relates to an improved method and apparatus for use in cutting or shearing gobs of glass from a molten stream of glass issuing from a feeder orifice.

The cutting device known as "shears" is positioned beneath the glass feeder. The shearing device is actuated by a driving mechanism which is controlled by a cam mechanism. The shape of the cam determines the number of cuts in a given period of time and also the operating speed of the moving shear blades. A typical pair of shear blades move in parallel planes which are usually horizontal and normal to the center line of a feeder discharge orifice. In the process of shearing glass, a volatile fluid such as oil is applied periodically to the blades to lubricate them and water is sprayed on them to cool them. The improved shear blades of this invention represent a departure from shear blade design which has remained static since about 1918. Normally functioning prior art shear blades depended on the correct adjustment of tension between the blades in order to have good shear life. It is an art to adjust blade tension which gives a gob sheared smoothly and yet without excessive wear to the shearing blades.

Figure 1:
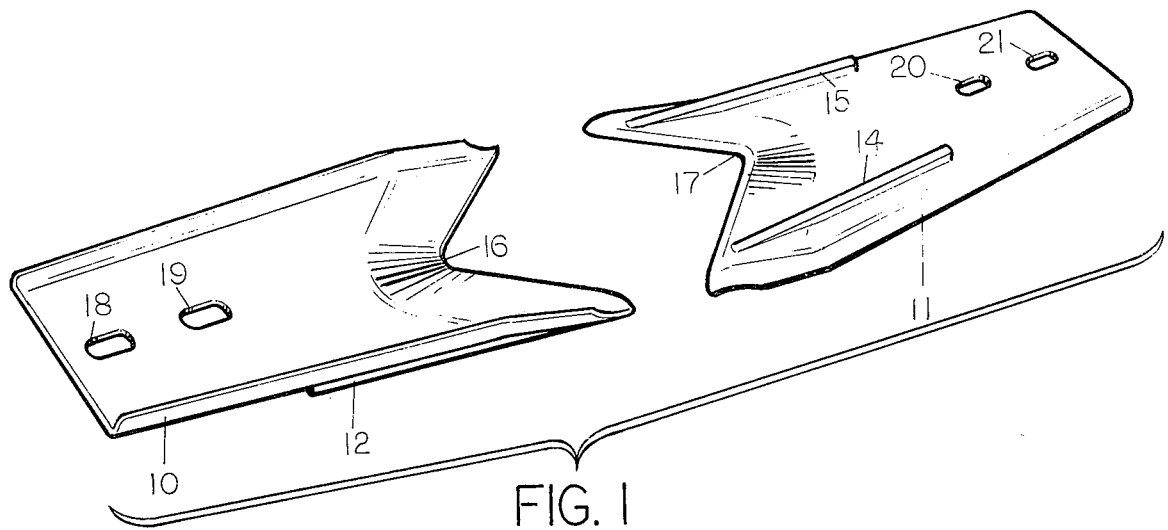
FIG. 1 is a perspective view of the cutting blades of one embodiment of this invention.
Figure 2:
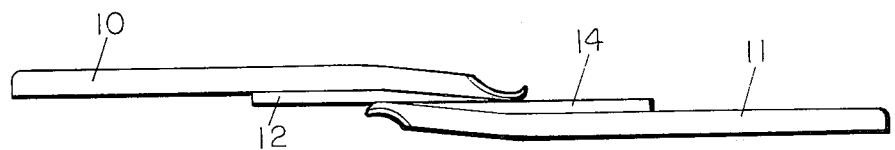
FIG. 2 is a side elevational view of a pair of cutting blades of this invention.

With reference to FIGS. 1 and 2, there is shown a complemental pair of blades 10 and 11. Blade 10 has raised portions or rails 12, which are formed on the lower surface thereof, and blade 11 has raised portions 14 and 15 positioned on the upper surface thereof. Blade 10 is formed with a concave cutting edge 16, and blade 11 has cutting edge 17. Blade 10 has openings 18 and 19 for mounting the blade to a holder. Similarly, blade 11 has openings 20 and 21. The blades, when in use, will functionally operate in relation to each other as shown in FIG. 2. The raised portions 12 and 14 will be in contact and the cutting edges of the blades will be slightly separated.

Figure 3:
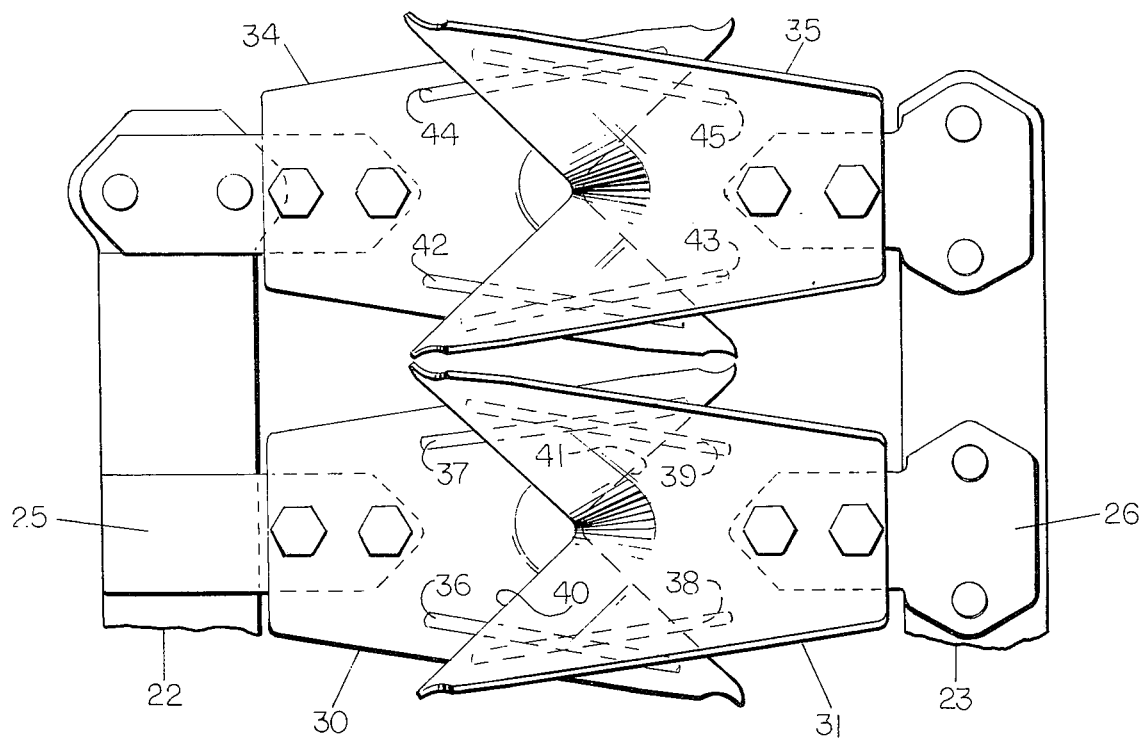
FIG. 3 is a top plan view of a double gob, shear blade arrangement.

Turning to FIG. 3, there is shown a top view of a double job cutting apparatus wherein two pairs of blades are mounted on blade holders. Blades 30 and 31 are mounted on conventional holders 25 and 26 respectively. The holders 25 and 26 are mounted on a pair of shear arms 22 and 23. Blades 34 and 35 are similarly mounted on arms 22 and 23 respectively. Blade 30 has raised areas 36 and 37 which are formed integrally thereon, and blade 31 has raised areas 38 and 39 formed thereon. A similar arrangement is shown for blades 34 and 35, where raised areas 42–45 are shown for the intermediate contact areas between the blades.

Figure 4:
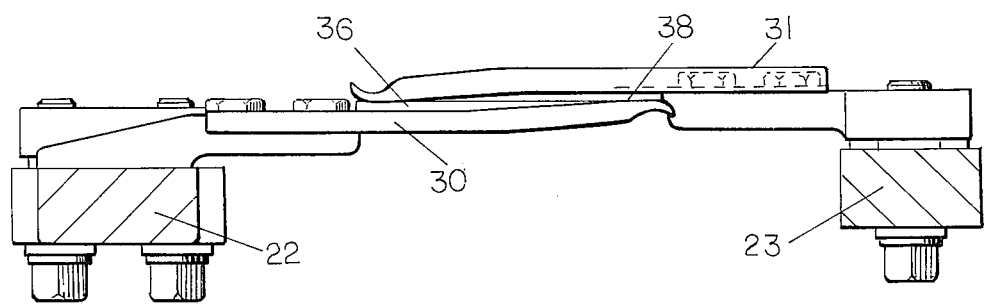
FIG. 4 is a side elevational view of the apparatus of FIG. 3.

Referring to FIG. 4, the functional relationship between raised portions 36 and 38 are shown clearly. The only contact between the shear blades is over the small overlapping portion of the raised area of each blade, and the cutting surfaces of the blades are separated by the preselected thickness of the raised portions of the shear blades. One benefit is the elimination of frictional contact between the cutting surfaces of the blades, which reduce wear on the blade and its cutting surface, because of the space maintained between opposed cutting edges. The cutting edges are now subjected only to the friction which results because of contact between the moving blade and the molten stream of glass being severed. Blade tension, a presently critical parameter, is eliminated as a factor when setting up the blades prior to a gobbing operation. The flat guide tracks maintain a space between the reciprocally cutting edges. This spacing is in the range of 0.01–0.001 inches and is preselected and incorporated into the pair of shear blades at the time of manufacture. This eliminates the necessity of blade tension adjustments during the start-up of a set of shear blades.

The cutting edges of the blades, for example 40 and 41 as designated in FIG. 3 with respect to the blades 30 and 31, are relatively sharp and during the cutting operation with respect to the column or stream of molten glass will pass through the stream, severing the stream as they overlap slightly in their reciprocating operation. The particular view shown in FIGS. 3 and 4 are of the blades in complete overlapping position and would correspond to the final position of the blades prior to their being retracted.

Figure 6:
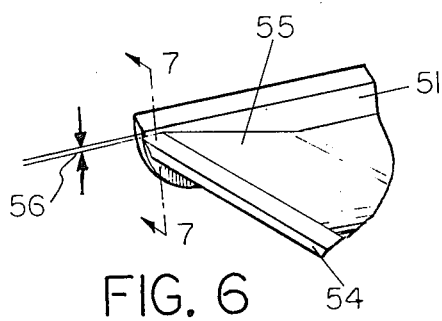
FIG. 6 is a partial perspective view, at an enlarged scale of the shear blade of FIG. 5.
Figure 7:
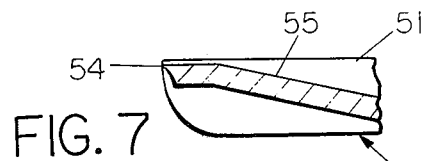
FIG. 7 is a cross-sectional view taken at line 7—7 of FIG. 6.
Figure 5:
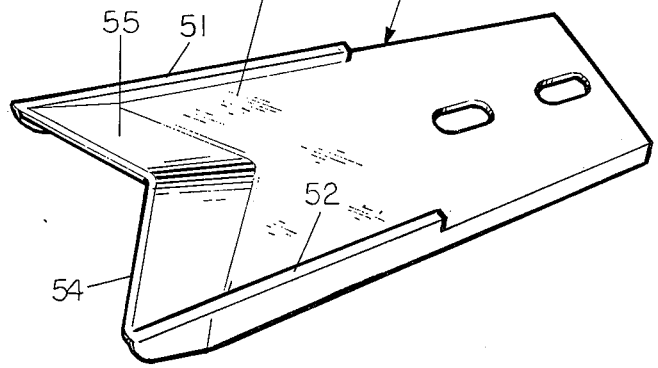
FIG. 5 is a perspective view of another embodiment of a shear blade of the invention.

A second embodiment of the blade construction of the invention is shown in FIGS. 5–7, wherein the blade itself is cast or made by a process known as "microcasting". Blade 50 is cast with raised edge portions 51 and 52 which are divergent in direction relative to the central axis of the blade 50 and has a cutting edge 54 that is hollow-ground, as best shown in FIG. 7, it being understood that the particular blade illustrated in FIGS. 5–7 is the lower blade of a pair and that an identical blade to that shown, turned 180°, would form the upper blade. A sloping surface 55 extends upwardly from the flat plane 53 of the blade 50 and the cutting edge 54 terminates in the forward or leading edge of the raised portion 55. It should be understood that there is a space or gap provided between the raised portions 51 and 52 and the cutting edge 54, this gap being designated 56 in FIG. 6. This gap would be in the order of 0.01–0.001 inches. The gap actually shown is, of course, exaggerated for illustration purposes.

It can readily be seen that with the configuration of either embodiment, the cutting edges themselves do not actually physically come in contact with each other, in operation, as was the case in prior shear blade configurations. The raised portions or rails serve to provide the gap between the cutting edges of the two overlapping blades. This slight gap permits the blades to be coated with solid film lubricants which are known lubricants in the glass formng art, having previously been used as coatings for delivery equipment. Solid film lubricants are composed of solid lubricating pigment or pigments, e.g. molybdenum disulfide or graphite or mixtures thereof, dispersed in a solid binder. The solid binder, preferably, is a cured thermoset polymer, for example phenolics and siloxanes. These materials exhibit a lubricating property with respect to hot glass, do not normally cause deleterious thermal checks in the glass and are capable of withstanding the temperatures encountered in intermittent contact with molten gobs of glass. One characteristic of these lubricant materials is that they do not exhibit extremely high resistance to mechanical friction such as would be encountered if the blade edges which are coated would be in sliding contact with each other under the normal 5–30 pounds tension of present blades. However, the cutting edges of the blades of the present invention, which are coated, do not frictionally rub against each other except in the rail or raised portion areas which do not necessarily have to be coated with the lubricant. The only friction encountered by the blades is with the stream of glass which the solid film lubricant material is most advantageously suited to withstand. Thus it can be seen that with the apparatus of the invention and the process of shearing carried out by the operation of the apparatus, a stream of glass may be severed into successive mold charges or gobs. Shear blades which are coated with a solid film lubricant are capable of operation without requiring lubricants being sprayed on during the operating of the blades. The blades may be run dry, provided cooling is provided, such as having water or coolant circulating in tubes or passages in thermal contact with the blades to extract heat therefrom to prevent overheating. The blades may also be cooled in the manner that blades presently are cooled, by water spraying each cycle. This spray would be confined to water alone and would not contaminate the plant effluents.

I claim:

1. A pair of cooperating shear blades for severing a gob of molten glass from the end of a stream of glass, each blade comprising a metal plate having a rearward end for mounting said plate on a reciprocable shear arm, and a forward forked cutting edge end, raised rib members protruding from one side of said plates and having coplanar surfaces which define a shear plane, said rib members extending rearwardly from adjacent the tips of said forked cutting edge to beyond the rearmost portion of said cutting edge, and a contoured section sloping from said cutting edge rearwardly to the plate surface opposite from said shear plane side.

2. A pair of shear blades according to claim 1 wherein the lengths of the portions of the rib members lying rearwardly of said rearmost portion of said cutting edge are at least equal to the lengths of the portions of the rib members lying forwardly thereof.

3. A pair of shear blades according to claim 1 wherein said ribs extend along straight lines in non-parallel relationship to each other.

4. A pair of shear blades according to claim 1 wherein said cutting edge lies in a plane which is parallel with said shear plane and spaced therefrom a distance of between about 0.0005 to 0.005 inches whereby the cutting edges of the shear blades will be spaced from each other a cumulative distance of between about 0.001 and 0.010 inches.

5. A pair of shear blades according to claim 1 wherein at least the glass contacting portions of said plate are coated with an effective lubricating amount of a solid film lubricant.

6. A pair of shear blades according to claim 1 wherein said plate is formed by a stamping process and said rib members are bonded to said plate.

7. A pair of shear blades according to claim 1 wherein said plate and said rib members are integrally formed by a precision casting process and said rib members form the the side edges of said plate and are parallel with respect to each other.

8. An apparatus for shearing a molten stream of downwardly flowing glass comprising:
a pair of cooperating shear blades, each blade having a cutting edge on one end thereof;
means mounting said shear blades for generally horizontal reciprocation in overlapping relationship, the plane of the overlap defining a shear plane;
raised portions positioned on the shear plane side of each blade, said raised portions extending from the adjacent tips of the cutting edge of the blade to beyond any portion of the cutting edge; and
said cutting edges of the shear blades being spaced from each other a distance of from about 0.001 inches to 0.010 inches by the raised portions of each blade and an effective lubricating amount of a dry, solid film lubricant coating applied to the blade surfaces.

9. The apparatus of claim 8 wherein said coating is applied so as to cover at least the glass contacting cutting edges of the blades; and
the lubricant coating acting so as to provide a frictionless action between the moving shear blade coating edges and the molten glass.

10. An improved shear blade apparatus comprising:
a first flat elongated plate;
a cutting edge formed in one end of the plate, said cutting edge having arcuate shape;
a plurality of openings formed in another portion of the elongated plate;
a first raised portion along a side edge of the elongated plate;
a second raised portion along another edge of said plate, said raised portions being positioned in a non-parallel relationship;
a second flat elongated plate, said plate having a cutting edge;
a first raised portion along a side edge thereof;
a second raised portion along another side edge; said raised portions being in a slideable, contacting relationship and movable relative to each other; and
the raised portions of the plates maintaining the cutting edges in a non-contacting relationship.

11. A method of severing a stream of molten glass comprising the steps of:
providing a downwardly flowing stream of molten glass;
positioning a pair of shearing blades having a cutting edge in a position to periodically interrupt the flowing stream; and
moving the shearing blades in a reciprocating manner so as to interrupt and shear the stream while maintaining the cutting edges in a non-contacting relationship so that the only frictional contact is between the cutting edge of the shearing blades and the molten glass stream.

12. The method of shearing a molten glass stream into discrete mold charges comprising the steps of periodically moving a pair of shear blades having the cutting edges coated with a solid lubricant, into engagement with a downwardly moving stream of glass from opposing sides of the stream, continuing the movement of said shear blades into complete overlapping relationship while maintaining the cutting edges of said blades in spaced-apart relationship wherein said spacing does not exceed 0.01 inches whereby the glass is severed and the only frictional engagement encountered by the cutting edges of the blades is with the stream of glass.

13. The method of claim 12, further including the step of spraying the blades with a coolant after the blades have completed severing the stream.

14. A method of shearing a molten stream of glass to provide a plurality of glass gobs comprising the steps of positioning shear blades adjacent a molten glass exit, and periodically shearing the molten glass into smaller pieces designated "gobs" while maintaining a separation between the shearing surfaces so as to eliminate friction between the shearing surfaces by moving the shearing surfaces together on raised portions thereof only.

* * * * *